No. 634,865.　　　　　　　　　　　　　　　　Patented Oct. 17, 1899.
L. W. BATES.
DREDGE.
(Application filed June 11, 1897.)

(No Model.)　　　　　　　　　　　　　　　　7 Sheets—Sheet 1.

WITNESSES:　　　　　　　　　　　　　　　INVENTOR:
　　　　　　　　　　　　　　　　　　　　Lindon W. Bates,
　　　　　　　　　　　　　　　　　　BY Dodge and Sons,
　　　　　　　　　　　　　　　　　　　　　ATTORNEYS.

No. 634,865. Patented Oct. 17, 1899.
L. W. BATES.
DREDGE.
(Application filed June 11, 1897.)
(No Model.) 7 Sheets—Sheet 2.

WITNESSES:

INVENTOR:
Lindon W. Bates,
BY Dodge and Sons,
ATTORNEYS.

No. 634,865. Patented Oct. 17, 1899.
L. W. BATES.
DREDGE.
(Application filed June 11, 1897.)

(No Model.) 7 Sheets—Sheet 3.

WITNESSES: INVENTOR:
Lindon W. Bates,
BY Dodge and Sons,
ATTORNEYS

No. 634,865. Patented Oct. 17, 1899.
L. W. BATES.
DREDGE.
(Application filed June 11, 1897.)
(No Model.) 7 Sheets—Sheet 4.

WITNESSES:

INVENTOR:
Lindon W. Bates,
BY
Dodge and Sons
ATTORNEYS.

No. 634,865. Patented Oct. 17, 1899.
L. W. BATES.
DREDGE.
(Application filed June 11, 1897.)
(No Model.) 7 Sheets—Sheet 5.

WITNESSES: INVENTOR:
Lindon W. Bates,
BY Dodge and Sons
ATTORNEYS.

No. 634,865. Patented Oct. 17, 1899.
L. W. BATES.
DREDGE.
(Application filed June 11, 1897.)
(No Model.) 7 Sheets—Sheet 6.

No. 634,865. Patented Oct. 17, 1899.
L. W. BATES.
DREDGE.
(Application filed June 11, 1897.)
(No Model.) 7 Sheets—Sheet 7.

WITNESSES:
A. C. Burdine.
D. E. Burdine.

INVENTOR:
Lindon W. Bates,
BY Dodge and Sons
ATTORNEYS.

UNITED STATES PATENT OFFICE.

LINDON W. BATES, OF CHICAGO, ILLINOIS.

DREDGE.

SPECIFICATION forming part of Letters Patent No. 634,865, dated October 17, 1899.

Application filed June 11, 1897. Serial No. 640,356. (No model.)

*To all whom it may concern:*

Be it known that I, LINDON W. BATES, a citizen of the United States, residing at Chicago, in the county of Cook and State of Illinois, have invented certain new and useful Improvements in Dredges, of which the following is a specification.

This invention pertains to a dredge designed to operate upon the hydraulic plan, to be driven by electricity, and arranged so that its spuds or ladder may be raised, lowered, or easily adjusted to any desired elevation within their limits of movement by the use of compressed air as an agent to change their buoyancy. This change is accomplished by varying the relative quantities of air and water contained in their displaced volumes. It is obvious, however, that these latter characteristics are equally applicable to hydraulic dredges of bucket and endless-chain type when floating ladders or spuds are desirable or when a steam plant on board is used to directly drive the machinery, and also that this valuable buoyancy may be produced by any compressed gas or even by a simple water pump or ejector.

The adoption of hydraulic-dredge construction, whereby enormous quantities of materials are loosened and hydraulically raised, carried, and discharged to any desired place in any direction, necessitates the use of very large and powerful machinery, which under the ordinary method of self-contained structure and power-generating plant produces a very expensive and cumbrous machine, and one which under the ordinary circumstances for which they are designed becomes practically worthless property after this work has been performed. It is to a means of overcoming this disadvantage, as well as those of size, expense, and difficulty of manipulation and operation, that the present invention relates.

Summarizing the elements of a modern Bates hydraulic dredge in successive steps following the work performed upon the material there is a rotary, mechanical, or water-jet cutter to loosen material, which cutter is attached to a stiff suction-pipe sustained by ladders pivoted to the barge and telescopically connected at the pivotal point to a rigid pipe on board, which in turn connects to the rotary pump on board. This pump furnishes the suction for lifting and the pressure for discharge of the material which is driven through a rigid pipe to the stern of the boat, where by means of a flexible joint it enters a flexible floating discharge-pipe line. At the point where the flexible discharge-pipe line joins the barge, but on it and near its stern, are placed one or more vertical spuds, about which the boat alternately swings and steps ahead. In the swinging motion the cutter at the end of the suction-pipe describes an arc of a circle, the radius of which is called the "swinging" arm and measures the possible swing of dredge for different depths of cut as well as its useful performance for different conditions of duty. The prime movers necessary to operate such a dredge are those for large pumps, for cutters, for different hoists, for line-drums and the auxiliaries, for capstans, small pumps, &c. As the dredge increases in capacity the size and weight of the cutters or water-jet device, the suction, and other appliances become a very important and difficult problem in its design, for these must generally be carried as a load suspended and projecting out from the bow of the barge. To counterbalance this effect in the varying positions of the ladders and to maintain a proper balance on the barge at all times, large hulls of special design are required. Again, in order to bring the forces of this larger machine to act upon the maximum material in the minimum time it is very desirable to increase proportionally the length of the swinging arm; but this can only be obtained by a length of barge in excess of what is necessary to produce buoyancy and space for the machinery. By the plan proposed here these disadvantages are to a very large extent removed, and especially when electricity is used as the power to operate the dredge, as in this case complete control of every element can be brought under the hand of a single operator.

The accompanying drawings illustrate a dredge operated by electricity, combining the elements of floating ladders, floating extension-arm, and floating spuds, the former and latter being indicated as pneumatically operated.

Figure 1:
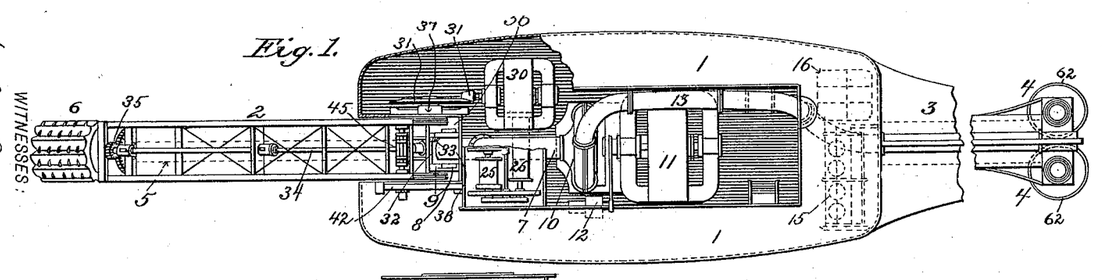
Figure 1 is a general plan.
Figure 6:
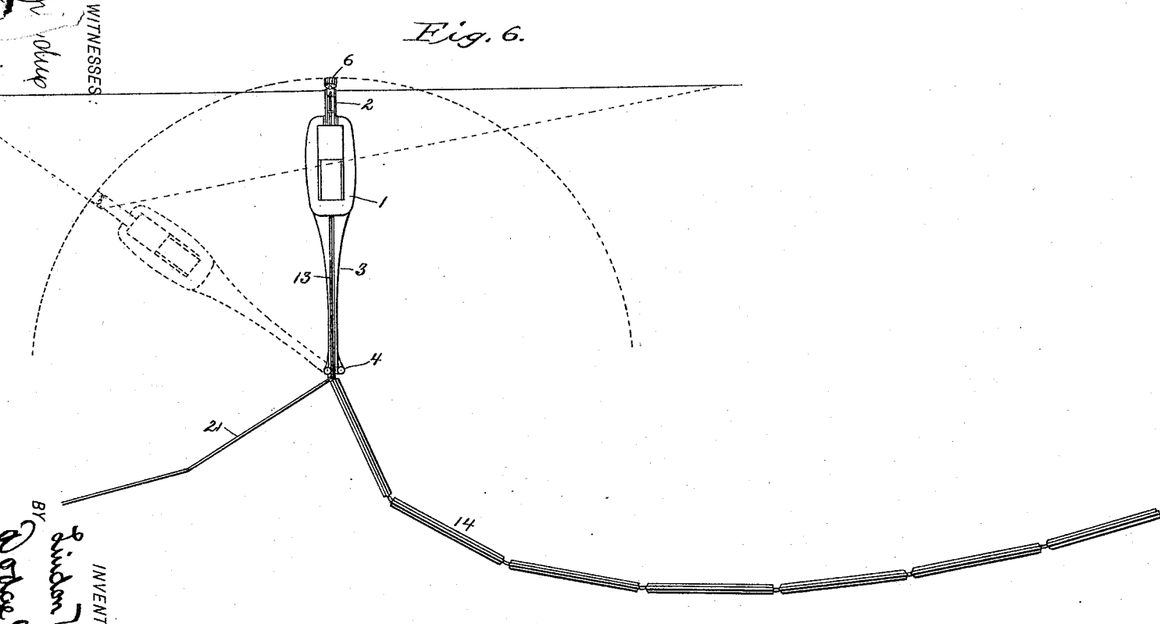
Fig. 6 is a general plan of the floating electric cable and the floating discharge-pipe line connected to the dredge, the same swinging in its cut.

Referring to Fig. 1 and to figures where similar numerals are found, there is shown a dredge, of which a barge 1 is provided with just capacity to float the necessary machinery. Its forward end is recessed to take the pivoted end of the floating ladder 2. At the stern of barge 1 is firmly attached the rigid floating extension arm or truss 3, at the outer extremity of which are secured the floating spuds 4 4. The pivoted floating ladder 2 carries the stiff suction-pipe 5, at the outer extremity of which is rotated the mechanical cutter 6. The other end of suction-pipe 5 is connected by means of bend 7 on boat through a circular telescopic joint 8 about pivot 9 to a rotatory pump 10. This pump 10 is driven by an electric motor 11, which, if of alternating-current synchronous type, is provided with an exciter 12. From the pump 10 a pipe 13 carries the material to stern of barge and out along the rigid extension-arm 3 to its extremity, where it is flexibly attached to the floating flexible discharge-pipe line 14. (See Fig. 6.) In addition there is placed upon the barge a combined air and water pump 15, driven by motor 16, the compressor part of 15 being connected to an air-reservoir 17 by a pipe 18.

At the forward end and partially spanning the ladder-well is located the operating-room 19, in which is placed the switchboard 20. Power-cable 21, which passes from transmission-lines into barge over the extension-arm 3 and from there into room 19, connects to this board 20, and from it circuits pass either directly or through transformer 22 for small machines to the operating-motors. In the forward part of same room 19 there is a general distributing-valve stand 23, from which pneumatic tubes controlled by valves lead to the ladder, spuds-drums, and devices for operating them. This valve-stand is connected by tube 24 to the air-reservoir 17. Just beneath the floor of this room 19 are located the two swinging drums 25 25 and one warping-drum 26, which control the lines for advancing and swinging the boat in the cut. These drums 25 26 are driven, through friction-clutches pneumatically set or loosened, by motor 27, located beneath, the power from this motor being transmitted through gearing 28 to the drum-spindles. Lever 29 controls the speed and torque of motor 30, which drives the cutter 6 by means of reduction-gearing as follows: bevel-gears 31 31, pivoting shaft 32 through side of ladder-well, bevel-gears 33 33, ladder-shaft 34, and spud-gears 35 35. All rotating parts outside of the barge are held in water-pressure bearings, the water for which is furnished by water-pump portion of pump 15.

Figure 7:
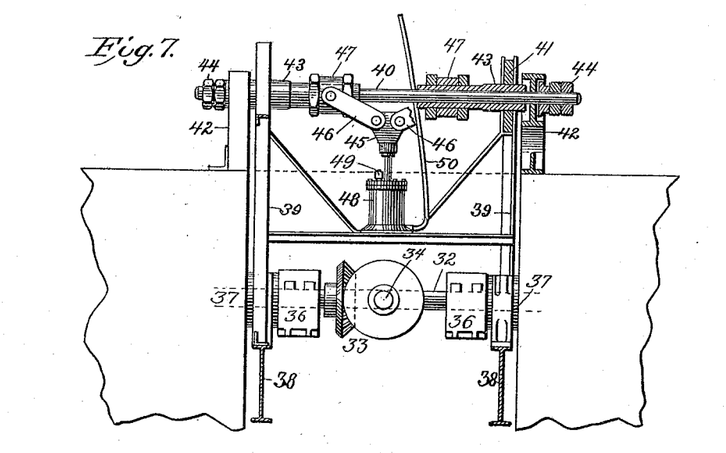
Fig. 7 is an elevation, on enlarged scale, showing the togglejoint and locking device for floating ladder.

The cutter 6 is attached to the end of the suction-pipe in a manner common to the Bates system now in extensive use. The ladder is pivoted at 9 by means of outside bearings 36, supported by the wall of ladder-well, and by inside bearings 37, anchored from bottom of barge. Referring to Fig. 7 the ladder will be seen to consist of two I-beam frames 38, vertically braced by trusses 39. Just above the pivoting-points of these frames 38 and in the trusses 39 is carried the locking device which holds the ladder rigidly in the desired position for a given depth of cut. This device consists of a shaft 40, which passes through the braces 39 and into segmental guides 42 42, consisting of T members, as shown, attached to the ladder-well slides of the barge. On the inside of guides 42 the shaft 40 carries shoes 43 43, which in passing through bearings 41 41 of braces 39 39 form bearings for shaft 40 and impinge the guides 42 42, holding them firmly against the washers and nuts 44 on either or both ends of shaft 40. The shoes 43 43 are set up by means of an air-cylinder and piston 48, acting through a toggle-joint 45, which consists of links 46, catching hold of adjustable collars 47 47, secured by nuts to shoes 43 43. The air-cylinder 48 may be double-acting to accomplish release as well as setting up of toggle-joint 45, or may be single-acting, as shown, using but one tube 50 for air connection. Shoes 43 43 are then set up by means of the air and released by pressure of air caught above the piston in the cylinder by release-valve 49 when the higher pressure in tube 50 is removed.

Figure 8:
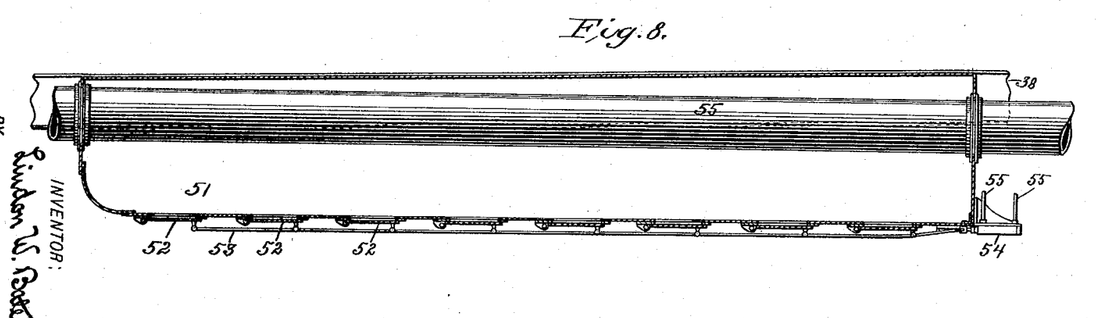
Fig. 8 is a longitudinal section of ladder-tank, showing its inlet and outlet valves and their operation.

The ladder is made buoyant by means of tank 51, Fig. 8, which is of sufficient size when full of air to float the cutter out of water down to its axis. This is sufficient to accomplish repairs. To get the desired cutting position of ladder by changing its buoyancy, the valves 52 are provided at any convenient places. These valves are represented in Fig.

8 as closed or opened or simply closed by rods 53 and air-cylinder 54, which is connected to general valve-stand 23 by tubes 55 55.

In operation the buoyancy of the tank 51 would just or slightly less than balance the weight of the entire floating ladder, so that when the latter is locked to position the guides 42 42 will not be subjected to more than the strains produced by the rebound of the cutter 6. To raise the ladder, the remaining water in tank 51 is forced out through valves 52, which may either be opened by the inside pressure or by air-cylinder 54.

Figure 9:
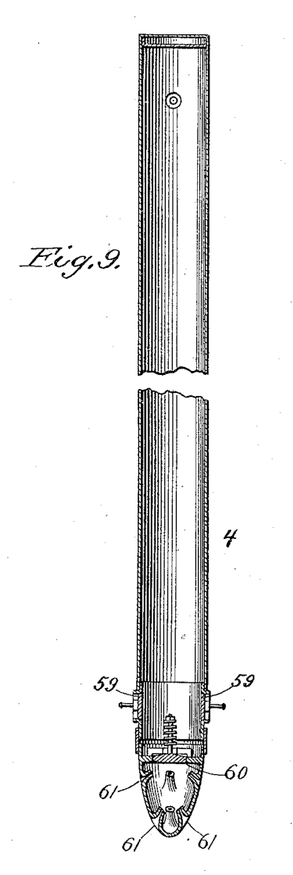
Fig. 9 is a longitudinal section of floating spud, showing its valves and nozzles.
Figure 10:
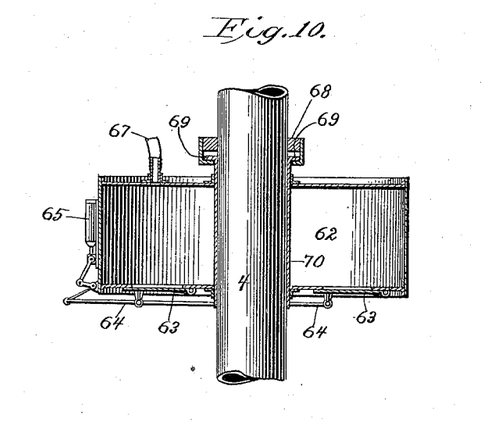
Fig. 10 is a cross-section of spud-tank and its valves.
Figure 11:
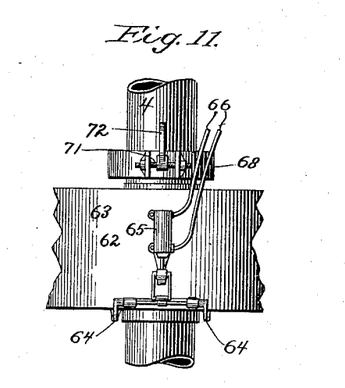
Fig. 11 is an elevation of same, showing attachment of tank to spud.

The extension-arm or floating truss 3, which reaches out to the spuds, is carried by a pontoon 56, joined to it or made part of it, as desired, and of sufficient buoyancy to relieve the barge of all weight of truss 3 and discharge-pipe 13. At the outward extremity of this arm 3 are the two spud-wells 57 57, which vertically guide and secure spuds 4 4 to the arm or truss 3. The construction and operation of these spuds are shown in Figs. 9, 10, and 11. They are made hollow and as light as possible in order to get the greatest buoyancy for a given size and strength. They are sealed at the top to act as a tank or at any intermediate position along their length, and at their bottom and lower sides are provided with outlet 60 and inlet-valves 59 and outlet-nozzles 61 61 in their conical tips.

In designing a dredge for canal construction, harbor-cleaning, or river-deepening it is necessary to have a form of spud that can be raised up very high or whose bottom when up shall at least reach the draft-line of boat and yet be long enough to drop down to considerable depths. To accomplish this and avoid large diameters of spud, a displacement-tank 62 is added, Figs. 10, 11, 2, 5, &c., and that it may accomplish its purpose it is provided with inlet and outlet valves 63, rods 64, and air-cylinder 65. The air-cylinder is connected to the general valve-stand when so used by tubes 66 66, and tank 62 is connected to the same stand by tube 67. This tank 62 can be slid along the length of spud 4 to any desired position by allowing the spud or the tank one to rise while the other remains fixed, and may then be secured in place by strap 68, which grips the body of spud 4 and at the same time catches under a shoulder 69 on the tank-sleeve 70. This strap 68 is drawn tight by a screw 71, which is provided with screw-threads of opposite direction on its ends and of such a pitch that a relatively small motion of handle 72 is sufficient to obtain the necessary grip. A worm and wheel operated by a crank would answer the same purpose.

At the bottom of the spud 4 are arranged nozzles 61 61 in suitable numbers, size, and position to cause the water ejected in this way to bore and tear away the soil about this extremity of the spud as it enters or is removed from the ground. This method enables the spud to be quickly set or raised from soil and is a very necessary addition to overcome the sticking and resistance of a stiff soil, where a spud has only its buoyancy to raise it and its light weight to set it.

It is to be noticed that the method of water ejection in the spud 4, Fig. 9, differs from that shown for tanks 51, Fig. 8, and 62, Figs. 10 and 11. In the case of tanks 51 and 62 the valves 52 and 63 act as both inlet and outlet valves and may be opened to let water in or out or closed to prevent entrance of water by the compressed-air cylinders shown in each case. They may also be forced open by interior pressure and the cylinder used only to close them, as the ordinary water-pressure on outside might not act quickly enough.

Under the construction shown in Fig. 9 the operation is performed with separate inlet and outlet valves and requires the maintenance of an interior air-pressure sufficient to overcome the water-pressure on the outside of inlet-valves 59, which is acting to open the latter or to raise them from their seats 75. Spring 73 on outlet-valve 60 must also be strong enough to keep the same on its seat 74, or rather to draw same back to its seat after water is ejected and ejecting-pressure is reduced to normal for holding valves 59 on their seats. To cause entrance of water, the interior pressure is simply removed and valves 59 immediately open. For ejection, valve 60 and similar ones on sides provide outlet for the quick discharge. It is obvious that either method may be used throughout.

Flexible tube 76 connects spuds 4, and tube 67 connects tank 62 with tubes 77 78, which lead to the valve-stand 23 in the operating-room 19.

Figures 2, 4:
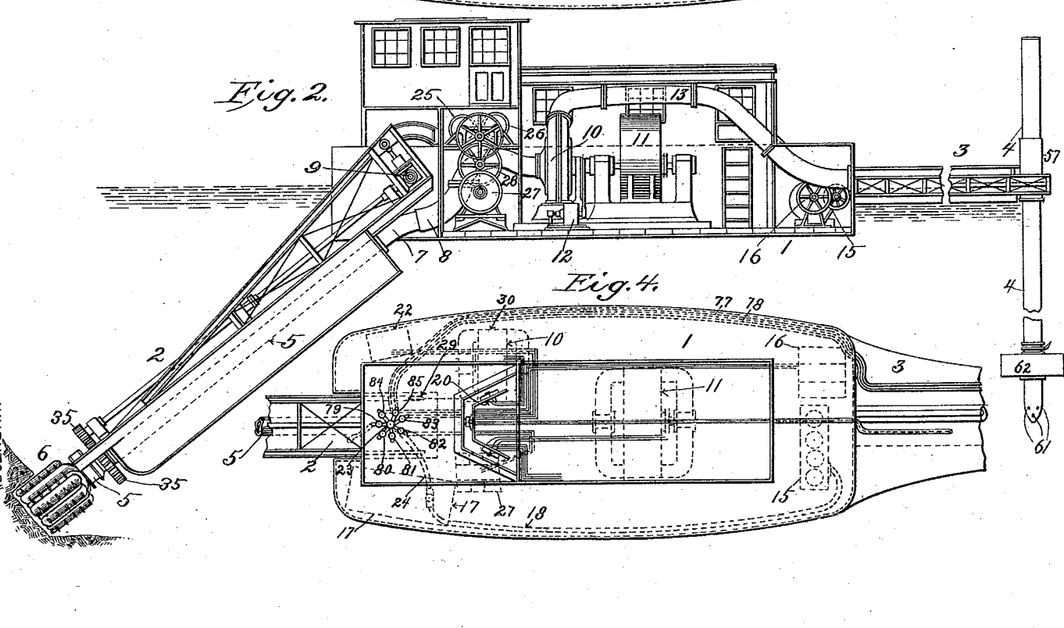
Fig. 2 is a vertical longitudinal cross-section.
Fig. 4 is a plan view of the pneumatic and electrical connections extending from the operating machinery or devices to the general operating-room.
Figure 3:
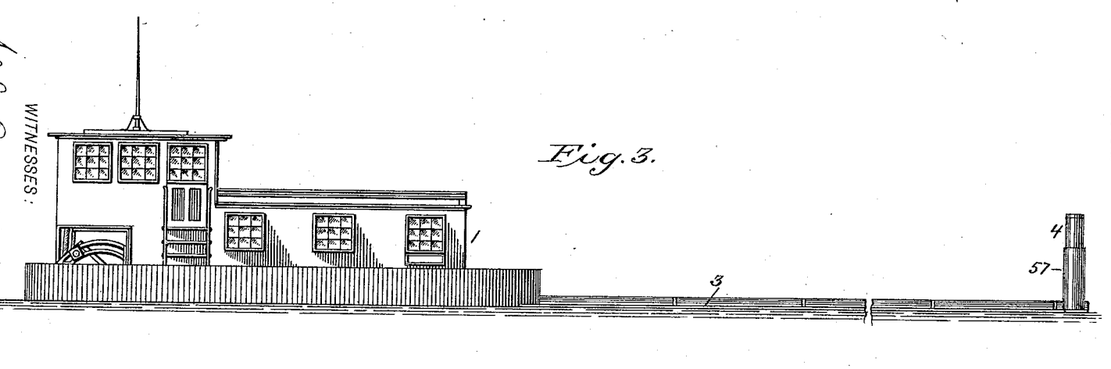
Fig. 3 is an elevation of that portion above water.
Figure 5:
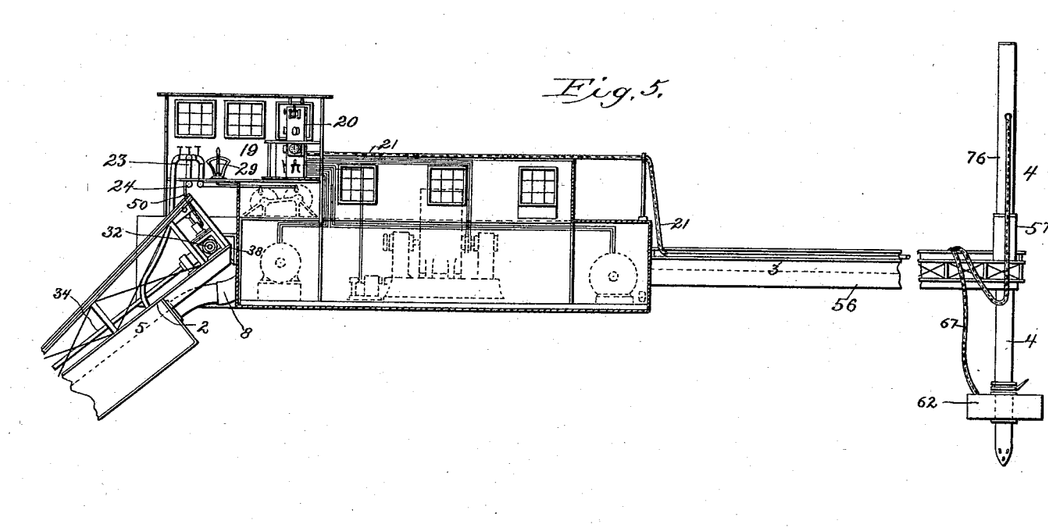
Fig. 5 is a vertical longitudinal section of Fig. 4.

The drawing of the general valve-stand 23, Figs. 4 and 5, show simply seven connections and seven operating-valves in the tubes. Of these 79 operates or controls the ladder-tank; 80, the air-cylinder of locking toggle-joint; 81, the spud; 82 83 84, the clutches of the swinging and warping drums, and 85 the remaining spud. Each of these valves is of two-way form and connects its tube to the air-reservoir 17, in which an average pressure of sixty pounds per square inch is maintained or opens it to the atmosphere for entirely freeing the tanks from pressure. When the air-cylinders 54 and 65 are used and in the way described, additional valves and tubes connected in a similar way will be attached to valve-stand 23.

Figure 12:
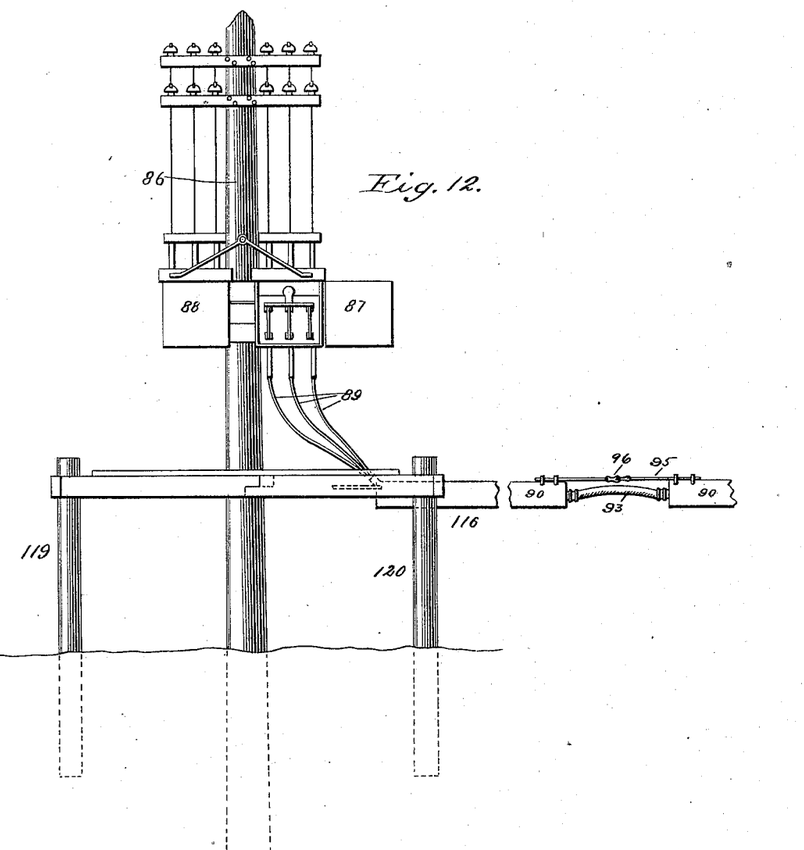
Fig. 12 is a view of pole-line junction-boxes and junction of cable from latter to floating pontoon.

When electricity is used, it becomes necessary to carry the transmission-cable 21 from the transmission-line to the dredge in some cases over considerable stretches of water. These dredges are constantly in motion, and a cable dragging along the bottom of the channel would have at best but a very short life. To prevent this unnecessary destruction, the cable is carried upon the surface of the water in floating pontoons, in which it is not only preserved from all water action, but is also relieved from all strain and is in a condition to be readily moved about to follow the maneuvers of the dredge. In the accompanying drawings the cable is shown as one element and the pontoon in suitable lengths and connected together as another. It is obvious, however, that these cables may be built with their own sheathing of sufficient diameter to furnish the buoyancy and float themselves upon the water as a single flexible line, doing away with so-called "pontoons" entirely, or they may reach the dredge over the discharge-pipe pontoons. It will also be found convenient in many cases where this system is used to carry a pole-line down the center of the working cut or parallel to the axis of the cut when the cable connects directly from the floating pontoon or sheath to the lines. In Fig. 12 a pole-line 86 passes down a cut in a slight depth of water and carries four three-phase circuits, two of which on either side receive taps to the junction-boxes 87 and 88. These junction-boxes contain switches connected in usual manner, as shown in box 87, which cut the current from the line to the cable. Insulated conductors 89 89 89 connect from the cable to the switch.

Figure 16:
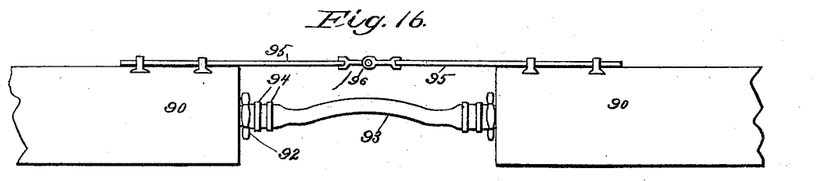
Fig. 16 is an elevation of common joint between any two pontoons within a cable-section.
Figure 17:
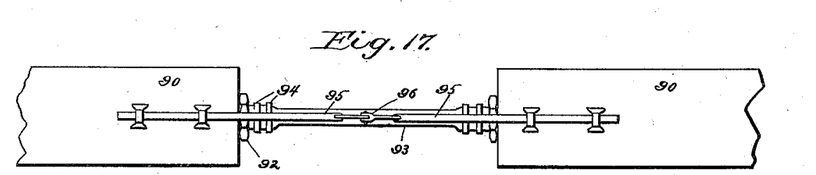
Fig. 17 is a plan of same.

The cable-pontoons 90, Figs. 14, 15, 16, and 17, are constructed of sufficient buoyancy to produce one-half submergence when the pontoon is loaded with cable. The pontoon is water-tight and the cable lies on its bottom, only rising at the ends of the pontoon to be drawn through sleeves 92, Figs. 16 and 17. It here spans the distance between the pontoons, that required for flexibility, and enters the next pontoon through a similar sleeve. This course is carried out in repetition for the section of cable length, which may vary from three hundred to six hundred feet. At these spanning-points a rubber hose 93 is drawn over the cable and attached over sleeves 92 by straps 94, which when drawn up tight at each junction make the cable-section water-tight, as illustrated in Figs. 16 and 17. The pontoons are further connected by rigid arms 95, connected by special links 96, common to pontoon connections of this kind. These arms 95, pivoted as shown, take all the strains that occur in pontoon-lines of this nature, and with the pontoons relieve the cable of all mechanical stress. At one end of each cable-section there is a junction-box 97, located at the end of the terminating pontoon 98, Figs. 14 and 15. This box 97 simply contains a highly-insulated plate of special form, which carries terminal pieces 99, to which the cable coming from inside of pontoon connects. The end of cable 100 in the following section, here shown split into its three parts 101 101 101, enters the top of junction-box 97 through flanges 102 102 102, and said parts connect to the terminals 99 99 99 before mentioned. The cable 100 leaving the forward section is protected by rubber hose 103, secured over pontoon-sleeve 104 by straps 105, which hose passes along the cable up to its point of splitting 106, where it is tightly held about the cable by straps 107. The parts 101 101 101 are similarly protected by hose 108 108 108, which passes from point 106 to box 97 and is secured at 105 by straps 109 and over flanges 102 102 102 by straps 110 110 110. At the junction-box end the connecting-arm 111 is made in a circular form, extending out from both sides of the pontoon in order to pass around the cable 100 as it rises to make the junction-box connection.

Figure 13:
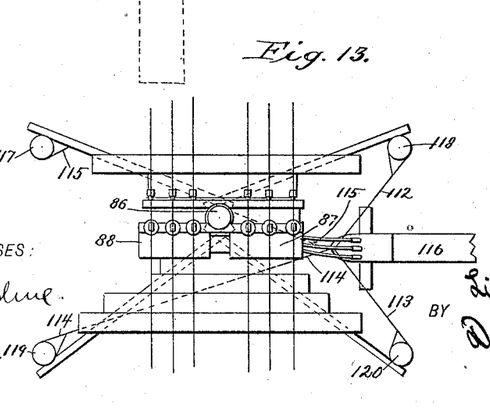
Fig. 13 is a plan of same, showing method of anchoring pontoon.
Figure 14:
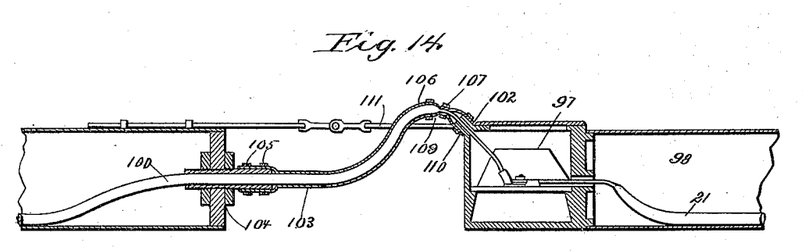
Fig. 14 is a section of pontoon, showing junction-box and cable connections between two cable-sections.
Figure 15:
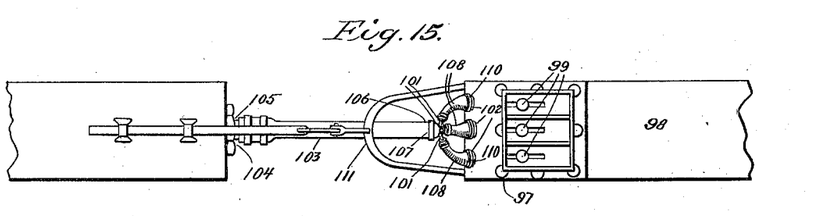
Fig. 15 is a plan of same.

When an electric cable connects to a floating-pontoon line, a fastening (shown in Fig. 13) is desirable to keep the pontoon in its place and avoid unnecessary chafing of the cable. Here the lines 112 113 114 115 connect to the arm 116 from poles 117 118 119 120, all holding the pontoon from different directions, and thereby preventing lateral or side motion, but leaving it free to move slightly up or down in wave action.

In the foregoing description the elements concerned in this apparatus have been sufficiently described to illustrate their operation, so that it simply remains to point out the convenience and advantages thus derived, when both electricity and the pneumatic devices are used.

The barge simply becomes a shell or a core to the apparatus to which the other elements are attached; but said elements are self-supporting and self-operating and practically independent. These features greatly increase the possible utility of the boat by making it narrow, of long swinging arm, long cutting radius of cutter-ladder, long spuds, and yet of very little draft of water. Greater advantage even is to be seen in its operation. All the valves which control the buoyancy of the ladder and spuds, the cylinder for locking the former, and the friction-clutches for turning drums for swinging and warping lines are arranged about a common valve-stand in the general operating-room and immediately in front of the operator. At his right is the lever for controlling the cutter-motor. Behind him is the switchboard containing switches for controlling the circuits to motors, for driving pumps, compressors, drums, &c. In addition there are instruments located in these controlling-circuits which by their readings indicate exactly what work the individual motors are doing, and therefore the output of the dredge at all times. These instruments also indicate how near to the capacity of the motors the work is being carried, thereby introducing a very valuable feature when different classes of material are being encountered.

By the foregoing arrangement every controlling and indicating device is located within easy reach and sight of the operator, thereby enabling the entire management of the machine to be placed in the hands of a single person with all the advantages of a more continuous and perfect operation in return.

As above indicated, there may be a single spud or two or more spuds at the outer end of the arm 3. Where therefore the claims recite a spud, it is to be understood that one spud or more than one is meant at the option of the user.

Having thus described my invention, what I claim is—

1. In a dredge, the combination of a suction-pipe; a cutter carried by said pipe; and a buoyant ladder for directly supporting and controlling the position of the suction-pipe, substantially as and for the purpose set forth.

2. In a dredge, the combination of a suction-pipe; a cutter; a buoyant ladder for supporting the suction-pipe and cutter; and means for controlling the buoyancy of the ladder.

3. In a dredge, the combination of a hull; excavating appliances; and a buoyant ladder connecting the excavating appliances and the hull and serving to support the former independently of other connections.

4. In a dredge, the combination of excavating devices; a bouyant ladder for supporting said devices; means for controlling the buoyancy of the ladder; and locking devices for holding the ladder at any desired adjustment.

5. In a dredge, the combination of a hull or boat; excavating devices; a buoyant ladder for supporting said excavating devices; means for controlling the buoyancy of the ladder; locking devices for holding the ladder in position; and means for effecting the movement of the ladder in the cut.

6. In combination with a dredge boat or hull, a buoyant arm rigidly fixed thereto and extending rearwardly therefrom, substantially as and for the purpose set forth.

7. In combination with a dredge, a buoyant arm rigidly fixed thereto and extending outwardly therefrom; and one or more hollow vertical spuds carried at the outer end of said arm.

8. In a dredge, the combination of a boat or hull; a buoyant arm rigidly fixed thereto and extending rearwardly therefrom; a hollow vertical spud carried at the outer end of said arm; and a hollow air chamber or tank adjustable on the spud.

9. In a dredge, the combination of a boat or hull; a buoyant arm rigidly fixed thereto and extending outwardly therefrom; one or more hollow vertical spuds carried at the outer end of said arm and provided each with a hollow air chamber or tank adjustable on the spud; valves for admitting water and air to the interior of the spud and tank and releasing them therefrom; and nozzles at the point of each spud to effect a clearance when the spuds are required to enter or leave the soil.

10. In combination with a dredge, an electric conductor for supplying current thereto; and a buoyant support for said conductor.

11. In combination with a dredge, a plurality of translating devices carried by the dredge; an electric cable for delivering current thereto; a sectional buoyant support for said cable; and an operating-stand upon the dredge, containing within easy reach of the operator controlling devices for the several translating devices.

12. In a dredge, the combination of a hull or boat; a buoyant ladder for carrying the cutting or excavating devices; means for controlling the buoyancy of the ladder; means for effecting the feeding movement of the ladder in the cut; an extension-arm projecting rearwardly from the hull or boat; a hollow spud or spuds carried at the outer end of said arm, each provided with an air chamber or tank adjustable on the spud; valves and nozzles for operating the spuds and air-chambers; electric motors mounted upon the dredge; an electric conductor for supplying current to said motors; a buoyant support for said cable; and an operating-stand upon the dredge, containing devices for directing and controlling the current.

In witness whereof I hereunto set my hand in the presence of two witnesses.

LINDON W. BATES.

Witnesses:
M. DIXON,
W. SHOOP.